R. E. MOSHER.
DETACHABLE LINING FOR MUD GUARDS.
APPLICATION FILED APR. 9, 1920.

1,390,634. Patented Sept. 13, 1921.

INVENTOR.
Ralph E. Mosher

UNITED STATES PATENT OFFICE.

RALPH E. MOSHER, OF AURORA, NEW YORK.

DETACHABLE LINING FOR MUD-GUARDS.

1,390,634.  Specification of Letters Patent.  Patented Sept. 13, 1921.

Application filed April 9, 1920. Serial No. 372,558.

*To all whom it may concern:*

Be it known that I, RALPH E. MOSHER, a citizen of the United States, residing at Aurora, in the county of Cayuga and State of New York, have invented certain new and useful Improvements in a Detachable Lining for Mud-Guards, of which the following is a specification.

This invention relates to protective linings for vehicle mudguards and more particularly to a water proof covering for the inner surface of automobile mud guards.

The primary object of the invention is to provide a removable water proof lining fixed to the inner surface of the mud guard in a manner that will permit it to be readily removed when the inner surface of the protective lining accumulates mud, tar and other substances which adhere to the mud guards and which render the appearance of the same unsightly.

The invention contemplates the provision of a lining of this character which may be destroyed after being removed so that a new lining may be substituted and which will be shaped to fit any of the mud guards or fenders on the various types of automobiles.

In the drawings illustrating one embodiment of the invention:—

Figure 1:
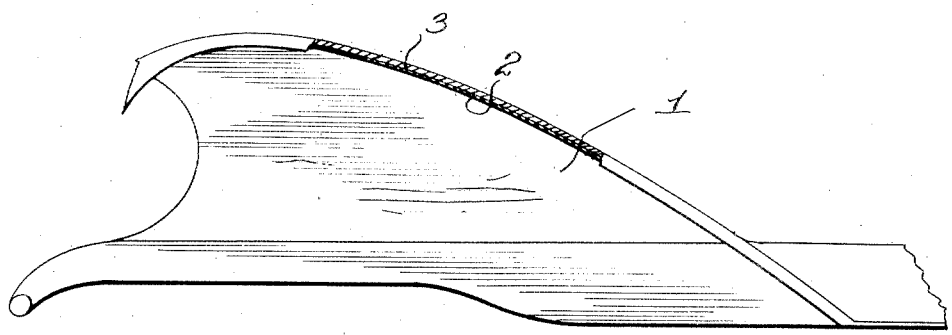
Figure 1 is a elevation, partly in section showing the application of the invention to an ordinary mud guard.
Figure 2:
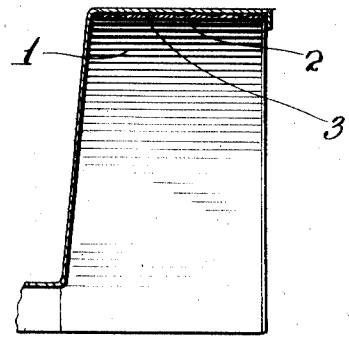
Fig. 2 is a transverse section through the same.

Referring to the various figures of the drawing by numerals, the fender or mud guard 1 illustrates the conventional form and shape of the mud guards now generally employed on automobiles and it will be apparent that the invention may be applied to either the front or rear mud guards or fenders. The lining 2 is constructed of any suitable material but preferably water proof paper which will be impervious to water and which will be of a length sufficient to cover the entire inner surface of the mud guard especially at the portions thereof which catch the mud and tar thrown up by the wheels during travel of the vehicle over a road. This lining 2 may be fixed to the surface of the fender in any suitable manner but is preferably attached by an adhesive which will be unaffected by water so that the loosening and consequental detachment of the lining will be prevented until such time as it is desired to remove the lining.

Figure 3:
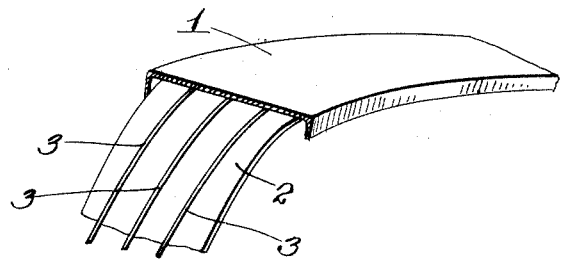
Fig. 3 is a detail perspective showing the general structure and application of the device.

Interposed between the lining and the fender is a series of cords or tapes 3 which are laterally spaced apart as shown to advantage in Fig. 3 and which are employed to facilitate the removal of the lining when the lining adheres too tightly to the fender. The lining should be of a color which will correspond to the general color scheme of the automobile upon which it is used.

Since the lining of this character may be very cheaply constructed it will be obvious that when the lining becomes coated with mud and tar it may be quickly removed by pulling the cords longitudinally downwardly from the fender and the mud coated lining may then be destroyed whereupon a new lining is fixed in place thus restoring the neat and clean appearance of the fender and making it unnecessary to go through the laborious task of scraping and washing the fender in the manner now generally employed. The cheapness and simple method of attachment will appeal to all automobile owners and it will be obvious that the device can be quickly attached and will be constructed at a minimum cost.

What I claim is:—

1. A removable protective lining for the mud guards of vehicles, comprising a sheet of water proof flexible material of a length and width sufficient to properly fit the inner surface of the mud guard, an adhesive interposed between the material and the mud guard to hold the material in position against casual displacement, and a series of elongated members interposed between the said covering material and the surface of the mud guard whereby the material may be readily removed by pulling on the said elongated members against the tendency of the adhesive to hold the material in place.

2. A protective covering for the inner surface of mud guards comprising a water proof lining, means to hold the lining to the mud guard, and a series of longitudinally extending cords transversely spaced apart and extending the full length of the covering and adapted to be pulled downwardly for removing the material from the mud guard.

In testimony whereof, I have affixed my signature in the presence of two witnesses.

RALPH E. MOSHER.

Witnesses:
 EDMUND DAUGHTY,
 W. A. BARTLETT.